2 Sheets—Sheet 1.

C. A. GRISWOLD.

Skirt-Supporting Corset.

No. 7,903. Reissued Oct. 9, 1877.

Witnesses:

Theodore B. Foster

A. S. Fitch

Inventor:

Catharine A. Griswold

By J. P. Fitch atty

N. PETERS, PHOTO-LITHOGRAPHER, WASHINGTON, D. C.

C. A. GRISWOLD.

Skirt-Supporting Corset.

No. 7,903. Reissued Oct. 9, 1877.

Witnesses:

Theodore L. Wooster

A. S. Fitch

Inventor:

Catharine A. Griswold

By J. P. Fitch

Atty.

N. PETERS, PHOTO-LITHOGRAPHER, WASHINGTON, D. C.

UNITED STATES PATENT OFFICE.

CATHARINE A. GRISWOLD, OF NEW YORK, N. Y.

IMPROVEMENT IN SKIRT-SUPPORTING CORSETS.

Specification forming part of Letters Patent No. 56,210, dated July 10, 1866; Reissue No. 4,427, dated June 20, 1871; Reissue No. 7,903, dated October 9, 1877; application filed August 30, 1877.

*To all whom it may concern:*

Be it known that I, CATHARINE A. GRISWOLD, of the city, county, and State of New York, (formerly of Willimantic, Connecticut,) have invented certain new and useful Improvements in Corsets; and I do hereby declare that the following is a full, clear, and exact description of the same, reference being had to the accompanying drawings, forming part of this specification, in which—

Figure 1:
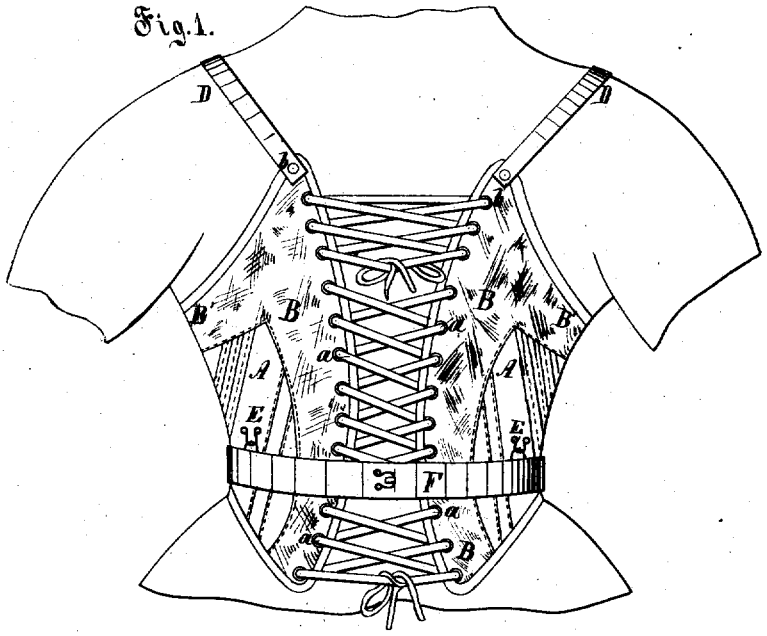
Figure 2:
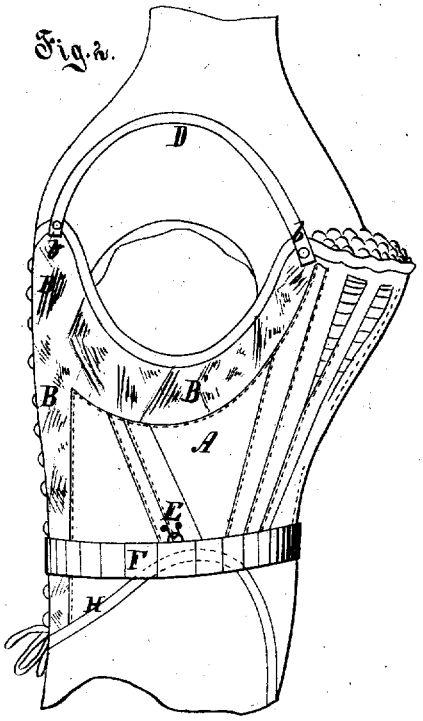
Figure 3:
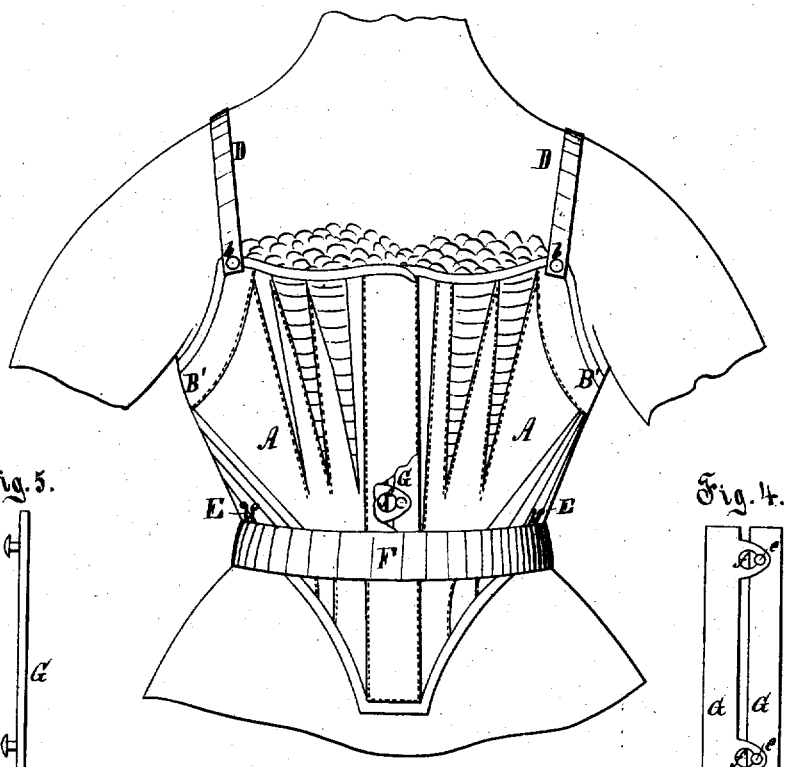
Figure 5:
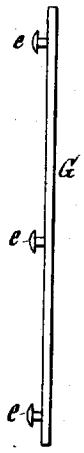
Figure 4:
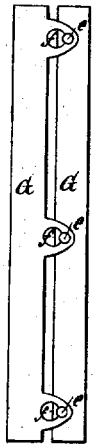

Figure 1 represents a back view of my improved corset. Fig. 2 represents a side view. Fig. 3 represents a front view. Fig. 4 represents a front view of the steel stays inclosed in the edges of the corset for securing the two parts together in front, and Fig. 5 represents an edge view of the same.

To enable those skilled in the art to which my invention belongs to make and use the same, I will describe it in detail.

The object desired to be obtained is to produce a waistcoat or corset made in two parts, and clasped or laced together in the front and back, and so shaped as to closely, neatly, and easily fit and support the body, and so that when the lacing is tightened the front of the shoulders will be drawn back more or less, as desirable, greatly to the support and comfort of the person; also, to support the clothes or skirts, &c., which usually are supported by the hips.

The nature of my invention consists in certain improvements in corsets, as will be hereinafter described.

In the drawing, the parts marked A A represent the two sides of the corset, which are provided at their back edges with metallic braces B, secured in the fabric, and having eyelet-holes passing through both the braces and fabric, carrying them, to receive the cord or lacing C, which joins the two parts A A at the back, and by the use of which the same can be properly laced and adjusted to fit the form of the wearer. The metallic back braces or steels, provided with eyelet-holes, are inclosed within the fabric, and holes made through the fabric corresponding to those in the steels. Eyelets (the metal eyelets in common use) may be then inserted in the said holes, passing through the fabric and steel, which may be flanged down upon the outer surface of the fabric on each side, whereby the fabric will be securely attached to the brace at each of said holes. This arrangement of parts will make firm and durable eyelet-holes for the lacing, and also secures the braces within the fabric, so that they cannot shift endwise, and thereby thrust their ends through the fabric, as is common when the said braces are held in pockets and the eyelet-holes pass simply through the fabric, and not through the braces.

The upper ends of the metallic stays B B may be extended forward along the top of the corset, as shown at B′, so as to form a support to the body beneath the arms and back of the shoulder.

By the use of steel stays in the rear part of the corset the back is supported in a very thorough manner, and any tendency of the wearer to become round-shouldered is, in a great measure, corrected.

Shoulder-straps D D are arranged to pass over the shoulders of the wearer, and their ends properly secured to the upper part of the corset at the front and rear, as indicated at *b*. These said straps D prevent the corset from working downward from its own tendency or from the weight of the clothing.

It will also be observed that the rear ends of the straps D D are secured to the upper ends of the metallic stays B B, whereby the latter are sustained in proper positions to give the desired support to the back and shoulders. This is an important feature in my invention, and one, too, which will be appreciated by the trade and those accustomed to use or wear corsets.

A series of hooks or fastenings, E, is arranged at proper intervals around the waist of the corset, upon which the skirts may be caught by loops or eyes. The skirts are thereby suspended from the shoulders by means of the shoulder-straps, and the resting of their weight upon the hips thus avoided.

The parts A A may be secured to each other at the front by metallic stays G G set in the fabric, one of which is provided with studs *e*, and the other with loops *f*, so that the two can readily be fastened as the corset is put on or taken off.

The lower edges of the corset at the sides are scalloped or curved upward, as seen plainly by the lines H, Fig. 2, thus carrying these side edges above the hips of the wearer, but fitting neatly thereto, thereby obviating the covering of the hips below their upper points, making a neater fit, and giving to the dress a more graceful contour than is done by the ordinary straight-edged corset, and leaving the hips free and unobstructed motion.

By the use of the within-described improvements it is believed that health and comfort will be greatly promoted.

I am aware that stays or steels of a corset have been inserted in the fabric, with holes passing through both the steel and fabric, but with independent and separate eyelets in each. I do not claim such a construction and arrangement of the steels, fabric, and eyelets.

Having described my improved back and skirt supporting corsets, what I claim as my invention, and desire to secure by Letters Patent, is—

1. A corset open and adjustable in the back, provided with shoulder-straps attached directly to the metallic back-supports B, as and for the purpose described.

2. A bodice or corset upon a metallic frame, open before and behind, adjustable in the rear, and having shoulder-straps and fastenings E for the skirt, as described.

3. A steel or stay of a corset or bodice provided with holes for the laces, and inclosed in the fabric, that is provided with coincident holes, together with eyelets that pass in said holes through both said steel or stay and fabric, as described.

CATHARINE A. GRISWOLD.

Witnesses:
A. S. FITCH,
M. F. CLIFTON.